July 14, 1970     I. S. GOODMAN     3,520,704

BRAZING PELLET

Filed July 7, 1967

WITNESSES
Robert C. Baird
James T. Young

INVENTOR
Isaac S. Goodman.
BY
Blair R. Studebaker
ATTORNEY

United States Patent Office 3,520,704
Patented July 14, 1970

3,520,704
BRAZING PELLET
Isaac S. Goodman, Livingston, N.J., assignor to Westinghouse Electric Corporation, Pittsburgh, Pa., a corporation of Pennsylvania
Filed July 7, 1967, Ser. No. 651,833
Int. Cl. C23c 1/04
U.S. Cl. 106—1       7 Claims

ABSTRACT OF THE DISCLOSURE

A brazing pellet of low carbon content, particularly adapted for brazing lead-in wires to the ferrules in sealed beam lamps, which pellet comprises approximately 94 to 97% by weight of a brass and/or bronze brazing metal, from about 3 to 5% by weight of borax flux, from about 0.3 to 1.0% by weight of finely divided silica and less than 1/10 of 1% by weight of a stearate.

BACKGROUND OF THE INVENTION

Brazing pellets for use in brazing lead wires to ferrules in sealed beam lamps are manufactured by a high speed pressing process from a finely divided homogenous mixture of powders which form the constituents of the brazing pellet. The essentials of the brazing pellet are of course the brazing alloy and a brazing flux which acts as a reducing agent to remove oxides from the material being brazed in order to achieve a good bond or braze. Additionally, when the high speed pressing process is employed to manufacture the brazing pellet a binder and lubricant must be added to the pellet to both hold the pellet together and permit the pellet to be ejected from the high speed pressing equipment. If a lubricant is not employed in the manufacture of the pellet the high speed pressing equipment quickly jams because of the inability to eject the pressed pellet from the pressing die as the die members expand and wind due to the increased temperatures. In the past, stearates have been used extensively to provide both the binding and lubricating function in the manufacture of brazing pellets. Unfortunately, all stearates have an extremely high carbon content and although approximately 50% of the carbon can be removed from the pellet by baking the pellet prior to use, an excessive amount of carbon is still present in the final braze. This carbon has an extremely deleterious effect on the finished sealed beam lamp by tending to deposit on the reflective surface of the lamp during brazing and then attacking the heated filament during operation of the lamp.

SUMMARY OF THE INVENTION

It is accordingly an object of the present invention to provide an improved brazing pellet for use in brazing lead-in conductors to ferrules in sealed beam lamps.

A further object of the present invention is to substantially reduce the stearate content and hence the carbon content of brazing pellets for use in brazing lead-in conductors to ferrules in sealed beam lamps.

Another object of the present invention is to provide a brazing pellet for use in sealed beam lamps which does not require baking prior to use.

The foregoing as well as other objects of the present invention are accomplished by providing a composite brazing pellet for brazing lead-in conductors to ferrules in sealed beam lamps which comprises a substantially homogeneous mixture of pressed finely divided materials, said materials including approximately 94 to 97% by weight of brazing metal, from about 3 to 5% by weight of a suitable flux, from about 0.3 to 1.0% by weight of silica and from about 0.03 to 0.10% by weight of a stearate. A brazing pellet constructed in accordance with the present invention is readily ejectable from the high speed pressing equipment, will provide a good braze in the sealed beam lamp and does not require the intermediate step of pellet baking prior to use.

BRIEF DESCRIPTION OF THE DRAWING

The above described objects and others, along with many of the attendant advantages of the present invention will become more readily apparent and better understood as the following detailed description is considered in connection with the accompanying drawings, in which.

DESCRIPTOIN OF THE PREFERRED EMBODIMENT

Although the brazing pellet of the present invention, as will be apparent, has numerous applications, it is particularly useful where elimination of carbon from the final braze is desirable and as such is extremely suitable for sealing lead-in conductors to ferrules in sealed beam lamps.

Figure 1:
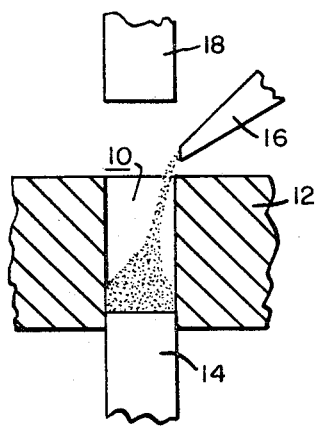
FIGS. 1, 2 and 3 are schematic illustrations of process by which high speed pressing equipment is utilized in manufacturing a brazing pellet.
Figure 2:
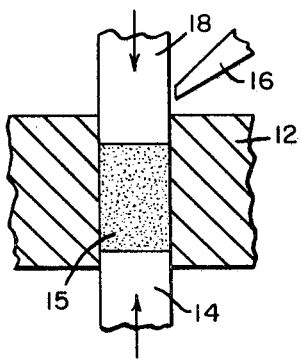
Figure 3:
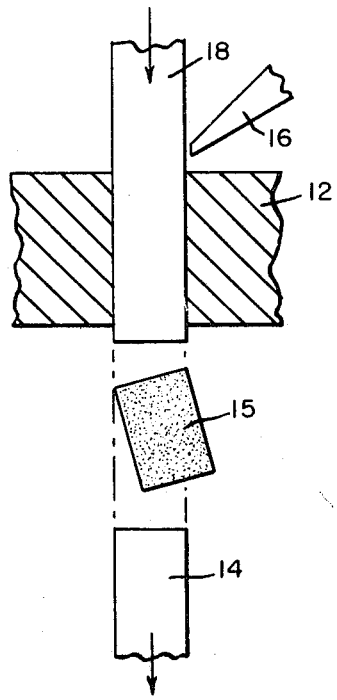

Referring now more particularly to FIGS. 1, 2 and 3, the method of manufacturing brazing pellets will be briefly described. FIG. 1 illustrates schematically a conventional pellet pressing die which is formed by a cylindrical opening 10 through die member 12. The die member 12 defines the lateral substantially cylindrical surfaces of the pellet pressing chamber 10. A lower reciprocal rod shaped piston 14 forms the bottom of the mold chamber 10 as illustrated in FIG. 1.

A homogeneous mixture of the brazing composition, in powder form, is introduced into the mold chamber 12, as for example by distribution tube 16, to fill the chamber 10 with a predetermined amount of the finely divided brazing material. An upper rod shaped piston 18 forms the remaining portion of the pellet pressing equipment.

When a predetermined amount of the finely divided brazing composition in powder form is introduced into the cavity 10 to pistons 14 and 13 then compact the powder into brazing pellet form by colinear movement toward each other to form the composite brazing pellet 15 as shown in FIG. 2.

As illustrated in FIG. 3, the piston rod 14 is then moved away from its pressing position and piston rod 18 continues to move through the chamber 10 ejecting the finished brazing pellet 15 therefrom. In the manufacture of brazing pellets in this manner, it will be readily apparent that the brazing material must include a lubricant to permit the pellet 15 to be ejected from the die mold 12 upon movement of the piston rod 18. The equipment is quickly bound and jammed by the lateral forces of the compressed pellet 15 on the side walls of the die mold 12 when a suitable lubricant is not employed in the brazing pellet composition. More importantly, due to the high speed operation, the heat generated will cause the members 12 and 18 to expand slightly thus reducing the size of the chamber 10 while increasing the size of piston 18 and hence the mechanism would jam in the absence of a suitable lubricant.

As indicated previously, stearates have been commonly used as a lubricant. However, to provide suitable bonding of the brazing material as well as the lubricant function amounts of stearate in excess of 1/3 of 1% by weight have been required which necessitates that the brazing pellet be baked prior to use. Even with the baking process only about 50% of the stearate and hence the carbon can be removed from the brazing pellet, which leaves a residual amount of carbon in excess of that desired. Excessive carbon reacts unfavorably with the lamp and tends to shorten the efficient life thereof by attacking the filament during operation of the lamp.

The brazing pellet of the present invention includes a brazing metal which constitutes approximately 95% by weight of the brazing pellet. The brazing metal may be all brass or all bronze. The brass may be composed by weight of from 55 to 80% copper and 20 to 45% zinc while the bronze may be composed by weight of from 70 to 90% copper and from 10 to 30% tin. Although the brazing metal may be entirely brass or bronze it is preferable that the ratio of brass to bronze by weight, be from about 50 to 75% brass and about 25 to 50% bronze with the optimum considered to be approximately 3 parts by weight of brass to 2 parts by weight of bronze The brazing pellet additionally includes a flux. Various types of materials can theoretically be used as a flux, i.e., as a reducing agent to remove oxides from the material being brazed, in order to achieve a good bond or braze. For example, various chlorides, fluorides or phosphates can be used as fluxes as well as borax, but as a practical matter, in such an application as the instant one, borax is particularly preferred due to the corrosive nature of the other brazing fluxes.

Although the stearate has not been completely removed from the brazing pellet composition of the present invention, less than $\frac{1}{10}$ of 1% by weight of stearate is now necessary and the expensive and time consuming step of baking the pellets can be eliminated. In the pellet of the present invention from 0.5 to 1.0% by weight of finely aerated sub-micron to micron size silica has been added to perform the binding function. The finely aerated silica preferably employed in brazing pellets of the present invention is sold under the trade name "Cabosil" by the Cabot Corporation of Boston, Mass. The amount of silica employed if of significance, it must not be excessive in order to avoid surface tension problems when the lead conductors are inserted into the liquified alloy during the brazing operation and yet be sufficient in amount to permit the greatest possible reduction in the amount of stearate employed.

As previously indicated a minute amount, less than $\frac{1}{3}$ of 1.0% by weight, of a stearate is still necessary to provide adequate lubrication of the high speed pressing equipment. The stearate may be either a metal stearate such as for example zinc, lithium or calcium stearate or an organic stearate. An organic stearate produced from stearic acid treated with glycerine to form a vegetable oil having a tri-styrene base and sold under the trade name "Sterotex" by the Capital City Products Company of Alabama is particularly suited for this application.

Figure 4:
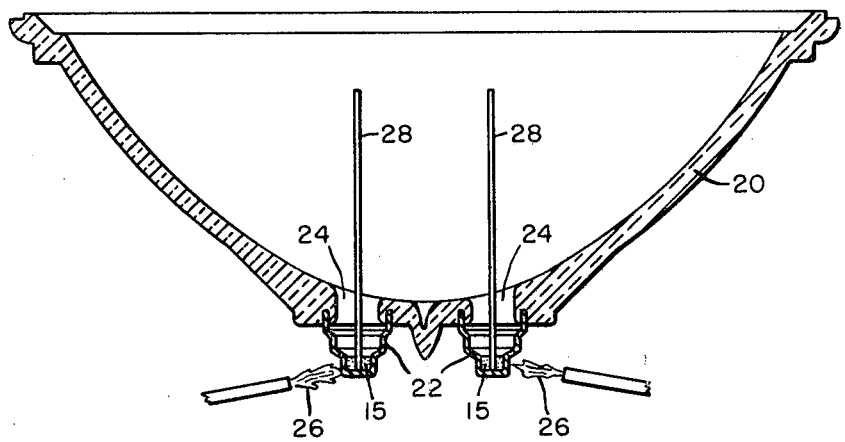
FIG. 4 is a sectional view through the reflector of a sealed beam lamp illustrating the brazing of the lead wires to the ferrules.

FIG. 4 illustrates the final step in brazing the lead wires or conductors 28 to the ferrules 22 of a sealed beam lamp. The reflector portion 20 of the sealed beam lamp has the ferrules 22 embedded therein about apertures or openings 24 in the reflector 20. A brazing pellet 15 is dropped into each of the ferrules 22 and the brazing pellet is then melted, as for example by brazing fires 26, and lead conductors 28 inserted therein while the brazing material is in liquid form. The brazing alloy is then permitted to harden to complete the braze of the lead-in conductors 28 to the ferrules 22.

As can be seen from the foregoing, the composite brazing pellet of the present invention includes approximately 94 to 97% by weight of brazing metal, from about 3 to 5% by weight brazing flux, from about 0.3 to 1.0% by weight of finely divided silica and less than $\frac{1}{10}$ of 1% by weight of a stearate and is particularly adapted for high speed pressing operations. Furthermore the brazing pellet of the present invention has an extremely low carbon content due to the significant reduction in stearate requirements and hence eliminates the requirement for pellet baking in the manufacture of brazing pellets for use in brazing lead conductors to ferrules in the manufacture of sealed beam lamps.

Since various changes may be made in the above-described invention without departing from the spirit thereof, it is intended that all matter contained in the foregoing description or shown in the accompanying drawings shall be interpreted as illustrative and not in a limiting sense.

I claim as my invention:

1. In a composite brazing pellet comprising a substantially homogeneous mixture of pressed finely divided materials for brazing lead-in conductors to ferrules in sealed beam lamps and in which said materials include approximately 94 to 97% by weight of a brazing metal selected from the group consisting of brass and bronze and mixtures thereof; from about 3 to 5% by weight of a suitable brazing flux; and a lubricating constituent: the improvement comprising maintaining in said homogeneous mixture a lubricating constituent which comprises from about 0.3 to 1.0% by weight of silica and from about 0.03 to less than 0.10% by weight of a metal stearate.

2. The composite brazing pellet according to claim 1 wherein said brazing metal is brass.

3. A composite brazing pellet according to claim 1 wherein said brazing metal is bronze.

4. A composite brazing pellet according to claim 1 wherein said brazing metal comprises from about 50 to 75%, by weight, brass and from about 25 to 50%, by weight, bronze.

5. A composite brazing pellet according to claim 1 wherein said suitable brazing flux is borax.

6. A brazing pellet according to claim 1 wherein said silica is finely aerated and of sub-micron size.

7. A brazing pellet according to claim 4 wherein said flux is borax and said silica is finely aerated and of sub-micron size.

References Cited

UNITED STATES PATENTS

| | | | |
|---|---|---|---|
| 1,959,775 | 5/1934 | Wilharm | 106—243 XR |
| 2,161,597 | 6/1939 | Swartz. | |
| 2,178,529 | 10/1939 | Calkins et al. | |
| 2,815,729 | 12/1957 | Goodman | 29—496 XR |

JULIUS FROME, Primary Examiner

L. B. HAYES, Assistant Examiner

U.S. Cl. X.R.

29—192, 496; 117—131, 160